3,381,042
PROCESS FOR PREPARING HALOGENATED
PROPANES
Harry L. Yale, New Brunswick, N.J., assignor to E. R.
Squibb & Sons, Inc., New York, N.Y., a corporation
of Delaware
No Drawing. Filed Jan. 27, 1967, Ser. No. 612,105
9 Claims. (Cl. 260—653)

ABSTRACT OF THE DISCLOSURE

This invention relates to a new process for preparing halogenated propanes, particularly 2,2,3,3,3-pentafluoropropanes. The pentafluoropropanes are prepared by first interacting tetrafluoroethylene with an alkali metal or alkaline earth metal fluoride, followed by reaction with a halogenated methane.

Heretofore, it had not been possible to prepare 2,2,3,3,3-pentafluoropropanes by employing the reaction between tetrafluoroethylene and a chlorinated methane, for example, since, as is known, when aluminum chloride is used, the product formed is a 3-chloro-2,2,3,3-tetrafluoropropane, $ClCF_2CF_2CRR'R''$. Surprisingly, it has been found that by using an alkali metal fluoride or an alkaline earth metal fluoride with tetrafluoroethylene there occurs first an addition of fluorine to one of the carbon atoms of the tetrafluoroethylene to give presumably an ionic species of the general structure $[CR_3CF_2Metal]^+$; this species can then react with the halogenated methane, e.g., $CH_2Cl_2$, to give $CF_3CF_2CH_2Cl$ and a metal chloride.

This invention, therefore, relates to a new process for preparing halogenated propanes and particularly 2,2,3,3,3-pentafluoropropanes of the formula: $CF_3CF_2CRR'R''$, wherein the R's are the same or different and represent hydrogen, chlorine, bromine or iodine. Many of such pentafluoropropanes are known. Those that are new can be used as refrigerant or as intermediates for more halogenated derivatives. Thus, 2,2,3,3,3-pentafluoro-1-chloropropane and 2,2,3,3,3-pentafluoro-1-bromopropane, for example, can be converted to 2,2,3,3,3-pentafluoro-1-bromo-1-chloropropane, a compound possessing anesthetic properties, by reaction with bromine or chlorine, respectively, as more fully described in my application, Ser. No. 554,671, filed June 2, 1966.

In accordance with the process of this invention these halogenated propanes are prepared by interacting tetrafluoroethylene ($CF_2=CF_2$) first with an alkali metal fluoride or an alkaline earth metal fluoride, followed by reaction with a halogenated methane of the formula:

$$ClCRR'R''$$

$BrCRR'R''$ or $ICRR'R''$, wherein R, R' and R'' are as hereinbefore defined.

Among the suitable halogenated methanes may be mentioned methyl chloride, methyl bromide, methyl iodide, methylene dichloride, methylene dibromide, methylene diiodide, chloroform, bromoform, iodoform, carbon tetrachloride carbon tetrabromide, chlorobromomethane, bromochlorofluoromethane, dichlorofluoromethane, chloroiodomethane, bromodichloromethane, dibromochloromethane and bromotrichloromethane. Methylene dichloride, methylene dibromide and chlorodibromomethane are particularly preferred.

Among the suitable alkali metal fluorides and alkaline earth metal fluorides may be mentioned lithium fluoride, sodium fluoride, potassium fluoride, rubidium fluoride, cesium fluoride, calcium fluoride, strontium fluoride and barium fluoride. Cesium fluoride is particularly preferred.

The reaction is preferably carried out under pressure, such as in an autoclave, the preferred pressure being about 5 p.s.i.g. to about 25 p.s.i.g. Although any temperature can be used, to increase the speed of reaction an elevated temperature, such as one of about 60° C. to about 150° C., is used.

The following examples illustrate the invention (all temperatures being in centigrade):

Example 1.—1,1,1-trichloro-2,2,3,3,3-pentafluoropropane

Cesium fluoride, 152 g., is slurried in 200 g. of purified triethyleneglycol dimethyl ether in a stirred pressure vessel. To the agitated slurry is added tetrafluoroethylene (freed of its terpene stabilizer by passage through silica gel just before entering the reaction vessel) until the pressure recorded is 10 p.s.i.g. The mixture is stirred for one hour and the stirring continued while 154 g. of carbon tetrachloride is introduced slowly. Subsequently, the mixture is heated slowly to 100° and maintained at 100° for about five hours during which time the pressure inside the vessel slowly drops to ca. 5 p.s.i.g. The contents of the reaction flask are distilled to give about 207 g. of 1,1,1-trichloro-2,2,3,3,3 pentafluoropropane, B.P. about 72°.

Example 2.—1-chloro-2,2,3,3,3-pentafluoropropane

By substituting 85 g. of methylene dichloride for the carbon tetrachloride in Example 1, there is obtained about 152 g. of 1-chloro-2,2,3,3,3-pentafluoropropane, B.P. about 28–30°.

Example 3.—1-bromo-1-chloro-2,2,3,3,3-pentafluoropropane

By substituting 209 g. of chlorodibromomethane for the carbon tetrachloride in Example 1, there is obtained about 220 g. of 1-bromo-1-chloro-2,2,3,3,3-pentafluoropropane, B.P. about 70.2–70.6°.

Example 4.—1,1-dichloro-2,2,3,3,3-pentafluoropropane

By substituting 200 g. of purified diethyleneglycol dimethyl ether for the triethyleneglycol dimethyl ether and 120 g. of chloroform for the carbon tetrachloride in Example 1, there is obtained about 183 g. of 1,1-dichloro-2,2,3,3,3-pentafluoropropane, B.P. about 45.5°.

Example 5.—1-iodo-2,2,3,3,3-pentafluoropropane

By substituting 268 g. of methylene diiodide for the carbon tetrachloride in Example 1, there is obtained about 241 g. of 1-iodo-2,2,3,3,3-pentafluoropropane, B.P. about 72°.

Example 6. 1-bromo-2,2,3,3,3-pentafluoropropane

By substituting 174 g. of methylene dibromide for the carbon tetrachloride in Example 1, there is obtained about 192 g. of 1-bromo-2,2,3,3,3-pentafluoropropane, B.P. about 46.5°.

Example 7.—1,1,1-trichloro-2,2,3,3,3-pentafluoropropane

By substituting 105 g. of rubidium fluoride for the cesium fluoride in Example 1, there is obtained about 141 g. of 1,1,1-trichloro-2,2,3,3,3-pentafluoropropane, B.P. about 72°.

Example 8.—1,1,1-trichloro-2,2,3,3,3-pentafluoropropane

By substituting 176 g. of barium fluoride for the cesium fluoride in Example 1, there is obtained 102 g. of 1,1,1-trichloro-2,2,3,3,3-pentafluoropropane, B.P. about 72°.

Example 9.—2,2,3,3,3-pentafluoropropane

By substituting 51 g. of methyl chloride for the carbon tetrachloride in Example 1, there is obtained about 104 g. of 2,2,3,3,3-pentafluoropropane, B.P. about −18°.

Example 10.—1,1-dibromo-2,2,3,3,3-pentafluoropropane

By substituting 253 g. of bromoform for the carbon tetrachloride and 125 g. of strontium fluoride for the cesium fluoride in Example 1, there is obtained about 252 g. of 1,1-dibromo-2,2,3,3,3-pentafluoropropane, B.P. about 90°.

The invention may be variously otherwise embodied within the scope of the appended claims.

What is claimed is:

1. A process for preparing a 2,2,3,3,3-pentafluoropropane which comprises interacting tetrafluoroethylene with an alkali metal or alkaline earth metal fluoride and then with a halogenated methane wherein the halogen is chlorine, bromine or iodine.
2. The process of claim 1, wherein the halogenated methane has the formula: ClCRR'R", wherein the R's are the same or different and represent hydrogen, chlorine, bromine or iodine.
3. The process of claim 2, wherein the reaction is carried out under pressure.
4. The process of claim 2, wherein the halogenated methane is chloroform.
5. The process of claim 2, wherein the halogenated methane is chlorodibromomethane.
6. The process of claim 2, wherein the halogenated methane is methylene dichloride.
7. The process of claim 2, wherein the halogenated methane is methylene dibromide.
8. The process of claim 2, wherein the fluoride is cesium fluoride.
9. The process of claim 8, wherein the reaction is carried out under pressure at an elevated temperature.

References Cited

UNITED STATES PATENTS 3,052,732   9/1962   Krespan _____ 260—653

OTHER REFERENCES

Stacey et al., Advances in Fluorine Chemistry, vol. 4, 80 (1965).

Rochow, Organometallic Chemistry, pp. 38 and 58 (1964).

DANIEL D. HORWITZ, *Primary Examiner.*